（12) United States Patent
Hayes

(10) Patent No.: US 7,868,292 B2
(45) Date of Patent: Jan. 11, 2011

(54) THERMAL INFRARED IMAGE DETECTOR

(76) Inventor: Robert Stephen Hayes, 4530 W. 166th St., Lawndale, CA (US) 90260

( * ) Notice: Subject to any disclaimer, the term of this patent is extended or adjusted under 35 U.S.C. 154(b) by 244 days.

(21) Appl. No.: 11/478,181

(22) Filed: Jun. 28, 2006

(65) Prior Publication Data

US 2007/0001116 A1 Jan. 4, 2007

Related U.S. Application Data

(60) Provisional application No. 60/694,839, filed on Jun. 29, 2005.

(51) Int. Cl.
*G01J 5/00* (2006.01)
(52) U.S. Cl. .................................. 250/338.1
(58) Field of Classification Search .... 250/338.1–338.5
See application file for complete search history.

(56) References Cited

U.S. PATENT DOCUMENTS

| 4,080,532 | A |   | 3/1978 | Hopper |  |
|---|---|---|---|---|---|
| 5,058,250 | A | * | 10/1991 | Turnbull | 29/25.35 |
| 5,122,666 | A | * | 6/1992 | Turnbull | 250/338.3 |
| 6,525,547 | B2 |   | 2/2003 | Hayes |  |
| 2002/0185602 | A1 | * | 12/2002 | Porter et al. | 250/338.1 |
| 2006/0118720 | A1 | * | 6/2006 | Roman et al. | 250/332 |

OTHER PUBLICATIONS

Tanaka et al., "Application of nematic liquid crystals to quasi-optical millimeter-wave devices," 2001, Proceedings of SPIE, vol. 4463. pp. 79-86.*
Willander et al., "Recent research and progress in photonic devices and materials,", 1997, The First IEEE International Symposium on Polymeric Electronics Packaging, pp. 4-13.*
Ruth et al., "Ferroelectric liquid crystalline polymers with large pyroelectric coefficients for infared detectors,", 1993, Proceedings of SPIE, vol. 1911, pp. 104-110.*
Baron, "Definitions of Basic Terms Relating to Low-Molar-Mass and Polymer Liquid Crystals", Pure Appl. Chem., 2001, pp. 845-895, vol. 73, No. 5.
Grayson, "Kirk-Othmer Concise Encyclopedia of Chemical Technology", 1985, pp. 703-705, John Wiley & Sons, New York, USA.

* cited by examiner

*Primary Examiner*—David P Porta
*Assistant Examiner*—Kiho Kim

(57) ABSTRACT

The invention is a device for detecting images formed by thermal infrared radiation. It uses a two dimensional array of thermally sensitive elements formed of material whose capacitance changes with temperature. Changes in capacitance of the detector elements are measured and used to form an electronic representation of the thermal infared image. The detector array can be fabricated using inexpensive materials and processes.

4 Claims, 9 Drawing Sheets

THERMAL INFRARED IMAGE DETECTOR

CROSS-REFERENCE TO RELATED APPLICATIONS

This application claims the benefit of Provisional Patent Application 60/694,839, filed Jun. 29, 2005.

STATEMENT REGARDING FEDERALLY FUNDED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention:

This invention is a device for forming images of objects using the thermal infrared radiation emitted by those objects. The infrared energy is absorbed by detector elements whose capacitance varies as a function of temperature. The changes in capacitance are detected and processed to form an electronic representation of the thermal infrared image.

2. Description of the Prior Art:

Previous infrared image detectors, such as that disclosed by Hooper, in U.S. Pat. No. 4,080,532, have used pyroelectric ceramic materials operated at a temperature close to the Curie point of the ceramic material. The ceramic material is formed by sintering a mixture of materials at high temperature and then adding electrodes by vacuum deposition. These processes require high temperatures and high vacuum, which increases the cost of producing the array. The ceramic material is difficult to form in thin layers. This results in thermal conduction between detector elements which degrades the spatial resolution of the array. The ceramic material also conducts heat to the substrate, which reduces the sensitivity of the array.

Another previous method of producing detector arrays is to use the techniques developed for integrated circuit production to form detectors by successive deposition and etching of several layers of different materials. The usual structure uses a material whose resistance varies with temperature to form sensing elements suspended above a substrate. Some materials which have been used as sensors include metal oxide mixtures, silicon, and vanadium oxide. These are usually deposited by a sputtering process in a vacuum chamber. This is a slow and expensive process. The separation of the detectors from the substrate is very small, which reduces the detector sensitivity.

A thid previous approach to fabricating detector arrays has been to fabricate an array of detectors on the surface of a large integrated circuit and to use a separate amplifier for each element in the array. This large area of the integrated circuit results in a substantial production cost.

The processes used in these approaches process the entire detector using high temperature or high vacuum. This increases the cost and limits the materials which can be used. Most organic materials cannot be used in these processes, since they either degrade at high temperature or severely contaminate vacuum systems by outgassing at low pressures.

BRIEF SUMMARY OF THE INVENTION

It is an object of the invention to provide an infrared imaging device that can be fabricated using low cost materials that are not suitable for high temperature or high vacuum fabrication processes. This allows the use of organic materials that previously could not be used to fabricate infrared detector arrays.

The invention uses thermally sensitive sensitive materials, such as liquid crystal material or pyroelectric materials, to detect temperature variations caused by the absorbtion of infrared energy. The temperature variations are sensed by sensing changes in the dielectric constant of the thermally sensitive materials. These changes are then represented in electronic form, which may be subsequently presented as a visible image.

REFERENCE NUMERALS USED IN THE DRAWINGS

Figure 1:
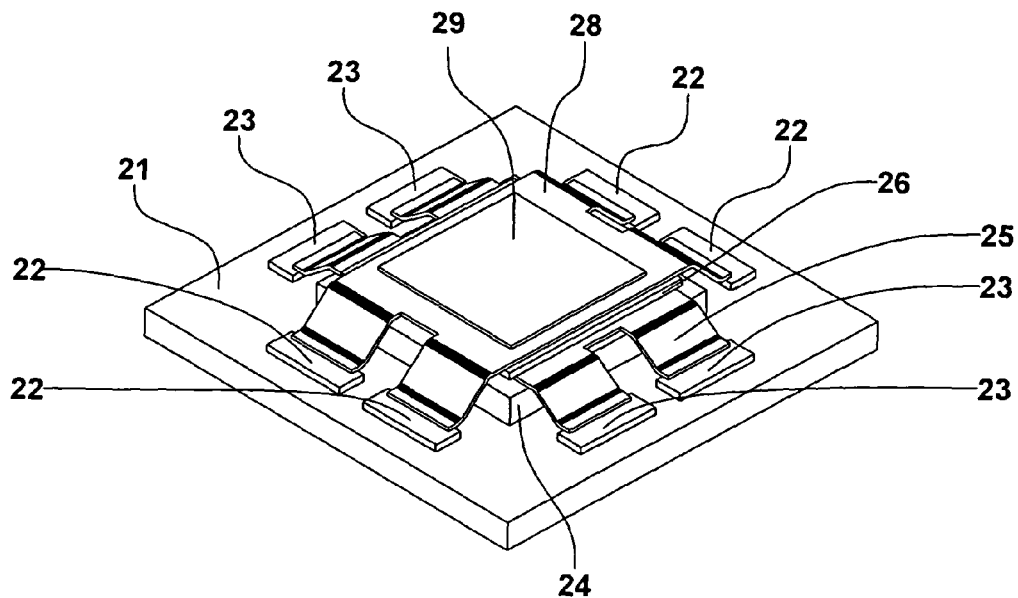
FIG. 1 shows the preferred embodiment of the thermal infrared detector array.

21 Substrate
22 Row Driver Integrated Circuit
23 Column Amplifier Integrated Circuit
24 Thermal Insulator 25 Lower Electrode Support
26 Electrode Spacer
27 Liquid Crystal
28 Upper Electrode Support
29 Infrared Absorbing Layer
30 Isolation Spacer
31 Row Electrodes
32 Column Electrodes
33 Pin Grid Array Package
34 Single Electrode Support
35 Solid Dielectric Material
40 AC Source (In Phase)
41 AC Source (Out of Phase)
42 Source Selection and Grounding Switch
43 Detector Element Array
44 Individual Detector Element
45 Compensation Element
46 Column Amplifier
47 Column Selection Switch
50 Infrared Optical System
51 Oscillator
52 Row Switch
53 Detector Array
54 Column Amplifiers
55 Timing and Control Logic
56 Column Switch
57 Rectifier
58 Coefficient Memory
59 Digital to Analog Conversion
60 Signal Processing
61 Image Display Device
62 Row Driver Circuits
63 Column Amplifier Circuits

DETAILED DESCRIPTION OF THE INVENTION

The image detector uses an array of thermally sensitive elements. Each element consists of two electrodes adjacent to a material whose dielectric constant is a function of temperature. The preferred material is a thermochromic liquid crystal operated at a temperature where the crystal alignment is changing. Other liquid crystal materials can also be used. Other materials, such as pyroelectric materials operated in the vicinity of their Curie temperature, are also suitable. Tryglycine sulphate is an example of such a material.

Liquid crystals are materials that are normally fluid, but have the property that the alignment of the molecules in the fluid is not entirely random. This alignment causes optical effects which are exploited in applications such as temperature indicating paints and liquid crystal displays. The degree of alignment also depends on the temperature of the material, and the temperature range in which the degree of alignment changes is as small as a few degrees.

One effect of these changes in orientation is a significant change in the dielectric constant of the liquid crystal material in only a few degrees of temperature change. This effect is used in the preferred embodiment of the present invention to detect the small changes in temperature due to incident infrared energy.

Previous practice has been to deposit electrodes on the thermally sensitive material in the infrared detector array, as taught by Hooper in U.S. Pat. No. 4,080,532. This is not practical with liquid crystals, since they are liquids in the desirable temperature ranges of operation. In the present invention, the electrodes are fabricated on thin electrode supports, which also serve to support and contain the liquid crystal material.

Both electrodes can be fabricated on a single electrode support, with the two electrodes on the same side and in the same plane. This construction is advantageous when the liquid crystal material is applied as a paint containing microencapsulated liquid crystal material. This electrode structure also minimizes the thermal mass which is associated with each detector element since only one supporting layer is used.

This single sided electrode structure is also advantageous when used with materials other than liquid crystal materials. It is most sensitive to changes in dielectric constant within a very short distance from the surface. Thus temperature changes on the surface of a material can be detected while ignoring temperature changes within the volume of the material. The single sided electrode structure is advantageous compared to electrodes placed on opposite sides of a thick section of material, which averages the temperature changes throughout the entire depth of the dielectric material.

When an infrared image is projected on a thick material of low thermal conductivity, the greatest change in temperature will occur close to the surface. As heat flows into the bulk of the material, the temperature change becomes less, and the heat also spreads laterally, reducing the spatial resolution of the image. The single sided electrode structure senses the temperature changes in the region where they are the greatest and before the spatial resolution has been degraded by lateral heat conduction.

The single sided electrode structure is particularly advantageous with materials such as triglycine sulphate. This material can be easily obtained in large crystals. However, it is water soluble, which makes multiple deposition and etching steps on the crystal surface impractical. The use of a separate single sided electrode structure avoids these problems. It can also be used with other organic materials that are unsuitable for high temperature or high vacuum fabrication processes.

Preferred Embodiment

Figure 1A:
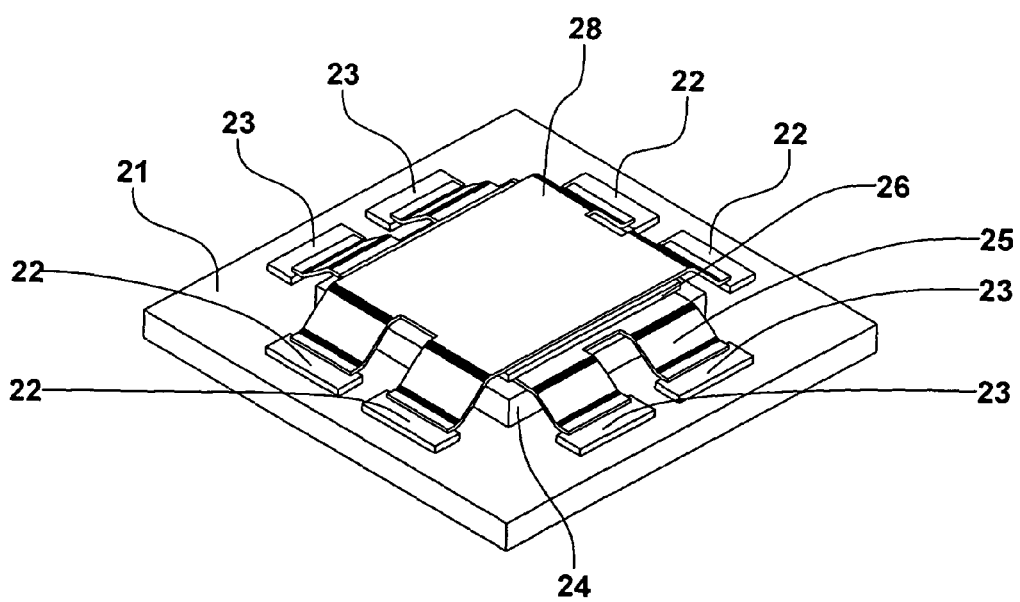
FIG. 1A shows the preferred embodiment with the infrared absorbtion layer removed.
Figure 1B:
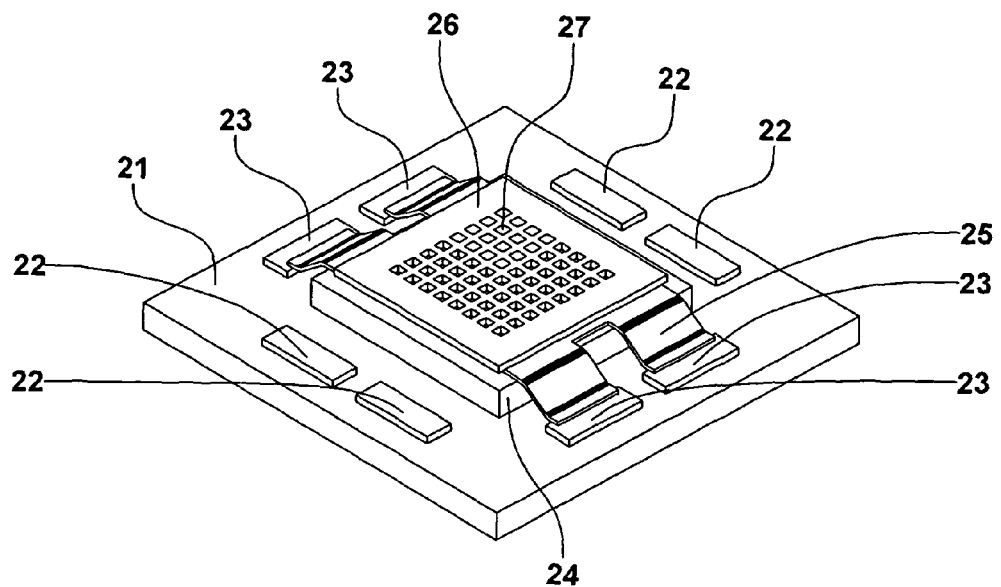
FIG. 1B shows the preferred embodiment upper electrode support removed. This shows the spacer with some cavities filled with liquid crystal material.
Figure 1C:
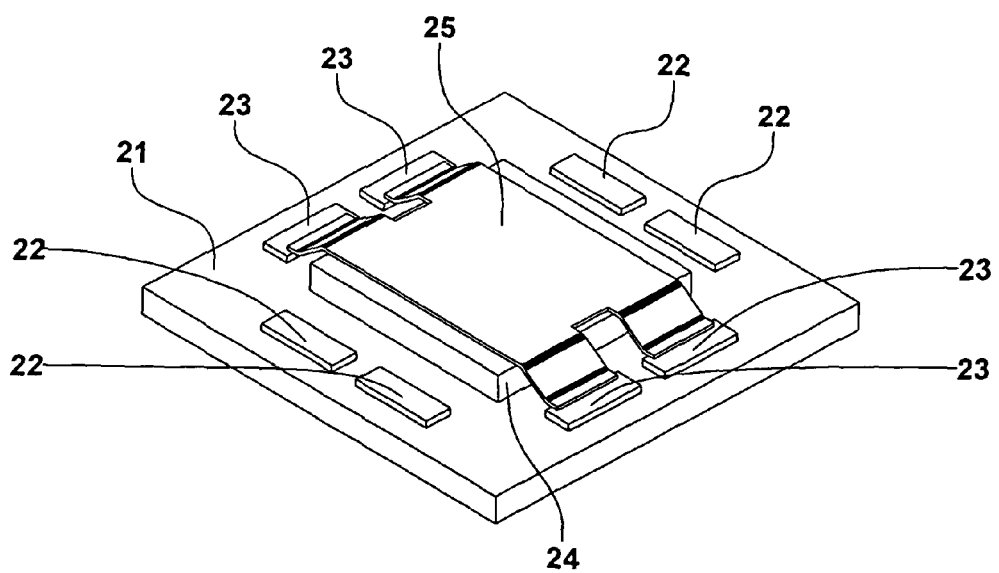
FIG. 1C shows the preferred embodiment with the spacer and liquid crystal material removed. This exposes the lower electrode support.
Figure 1D:
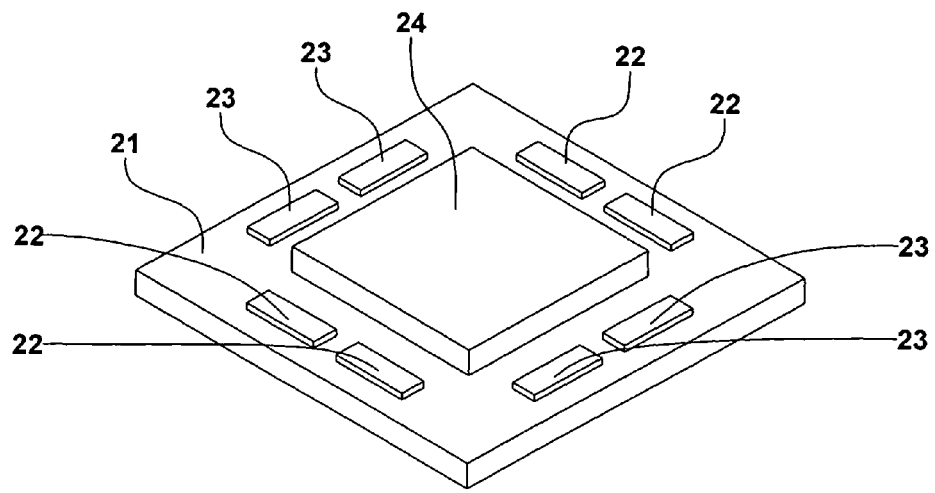
FIG. 1D shows the preferred embodiment with the row driver and column amplifier integrated circuits and the thermal insulator mounted on the substrate.
Figure 1E:
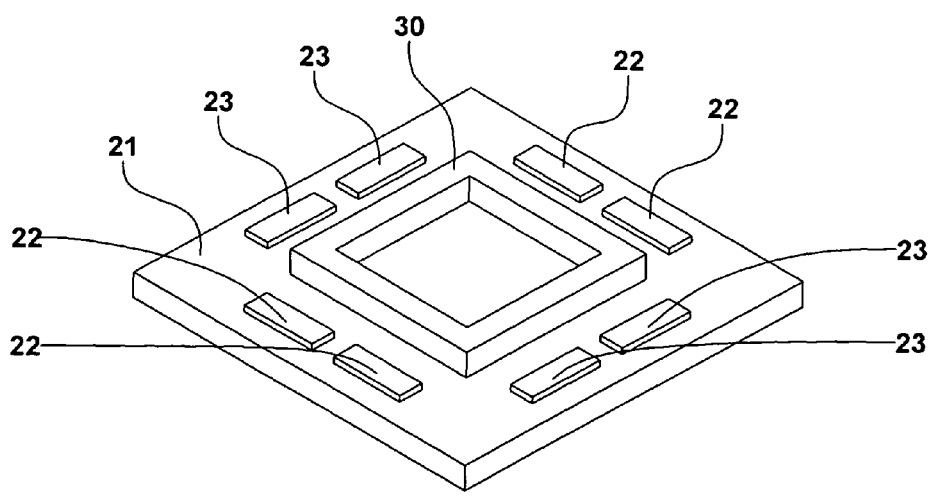
FIG. 1E shows an alternate construction where the thermal insulator has been replaced by a spacer with a gap under the detector array to isolate it from the substrate.
Figure 1F:
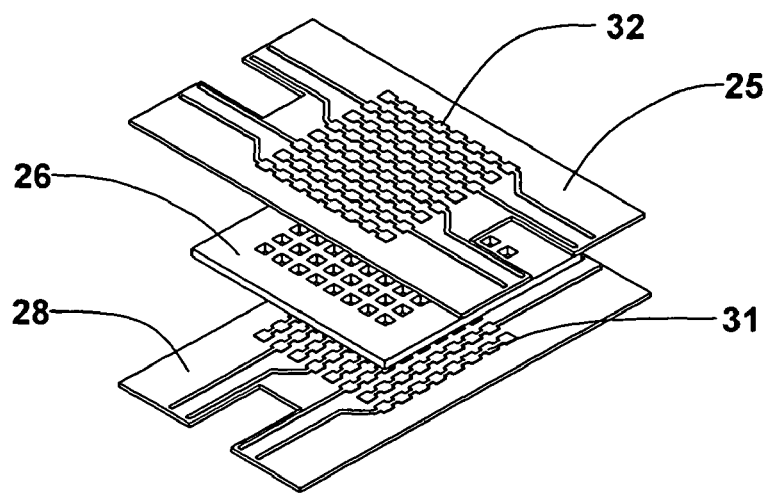
FIG. 1F is an exploded bottom view of the lower electrode support, spacer, and upper electrode support. The electrodes are also shown.

FIGS. 1 through 1F show a preferred embodiment of the detector assembly based on the use of a liquid crystal material as the thermally sensitive material.

The complete assembly is shown in FIG. 1. A substrate 21 supports the other parts of the assembly. The substrate temperature is controlled by a temperature control system and maintained at a temperature where the detector is most sensitive. The temperature of the substrate should be uniform in the area under the detector array. This may be achieved by using a thermally conductive material for the substrate, such as copper or kovar, or by making the substrate thick enough to allow lateral heat conduction. In this case, the substrate can be glass or ceramic.

Integrated circuits are mounted on the substrate to act as row drivers 22 and column amplifiers 23.

A thermal insulator 24 is mounted on the substrate. This insulator should be a material with high thermal resistance and low heat capacity. One possible material is styrofoam.

A lower electrode support 25 with column electrodes fabricated on its lower surface is mounted on the thermal insulator 24. The signals from the columns are sent to the column amplifiers 23. In the preferred embodiment, this connection is made using a tape automated bonding technique for connection to the integrated circuits. This technique is commonly used for interconnections in liquid crystal displays. The lower electrode support 25 and its conductive electrode pattern should be as thin as possible to reduce the lateral conduction of heat from one array element to its neighbors. Mylar, Kapton, or another suitable material can be used for this part. The electrode pattern can be formed by photolithography of a deposited film or by other methods such as vacuum deposition through a mask or silk screen printing.

The liquid crystal material 27 is held in place by a perforated spacer 26. This spacer 26 and the liquid crystal material 27 are placed on top of the lower electrode support 25.

An upper electrode support 28 is placed on top of the spacer 26 and the liquid crystal material 27. This support is similar to the lower electrode support 25, except that the electrodes are connected in rows rather than columns. Here the electrodes are on the bottom surface, and are connected to the row drivers 22. The electrode structures can be fabricated using the techniques developed for tape automated bonding.

An infrared absorbing material 29 is deposited on top of the upper electrode support 28. This may be either a suitable paint, a chemically treated metal deposit, or some other suitable material.

FIGS. 1 through 1D show the successive removal of these various parts from the detector array. FIG. 1 shows the complete assembly, with the substrate 21, the row driver circuits 22, the column amplifier circuits 23, the thermal insulator 24, the lower electrode support 25, the spacer 26, the upper electrode support 28, and the infrared absorbing layer 29. The liquid crystal material 27 and the electrodes are not visible in this view.

FIG. 1A shows the assembly with the infrared absorbing layer 29 removed.

FIG. 1B shows the assembly with the upper electrode support 28 removed. This exposes the cells formed in the spacer 26 and shows some of the cells filled with liquid crystal material 27.

FIG. 1C continues the disassembly process, with the spacer 26 and liquid crystal material 27 removed.

FIG. 1D shows the assembly with the lower electrode support 25 removed. It shows only the thermal insulator 24, the row drivers 22, and the column amplifiers 23 mounted on the substrate 21.

FIG. 1E shows a different isolation arrangement. Here the thermal insulator 24 is replaced by a gap filled with a suitable gas or with the air removed. The gap is established by a spacer 30 instead of the thermal insulator 24. The other structures remain the same.

The upper electrode support 28, the spacer 26, and the lower electrode support 25 are shown in more detail in FIG. 1F. This is an exploded view from the bottom showing the row electrodes 31 and the column electrodes 32. The electrodes are placed on the bottom side of the supports to allow connections to be made to the row drivers 22 and column amplifiers 23 by tape automated bonding without requiring vias in the electrode supports.

A protective enclosure for the detector assembly and a means for external connections will normally be required. These are not shown or discussed since any of several conventional packaging methods, such as ceramic or metal hybrid circuit packages with silicon or germanium windows, and any of several connection methods, such as tape automated bonding or wire bonds, can be used.

Second Embodiment

Figure 2:
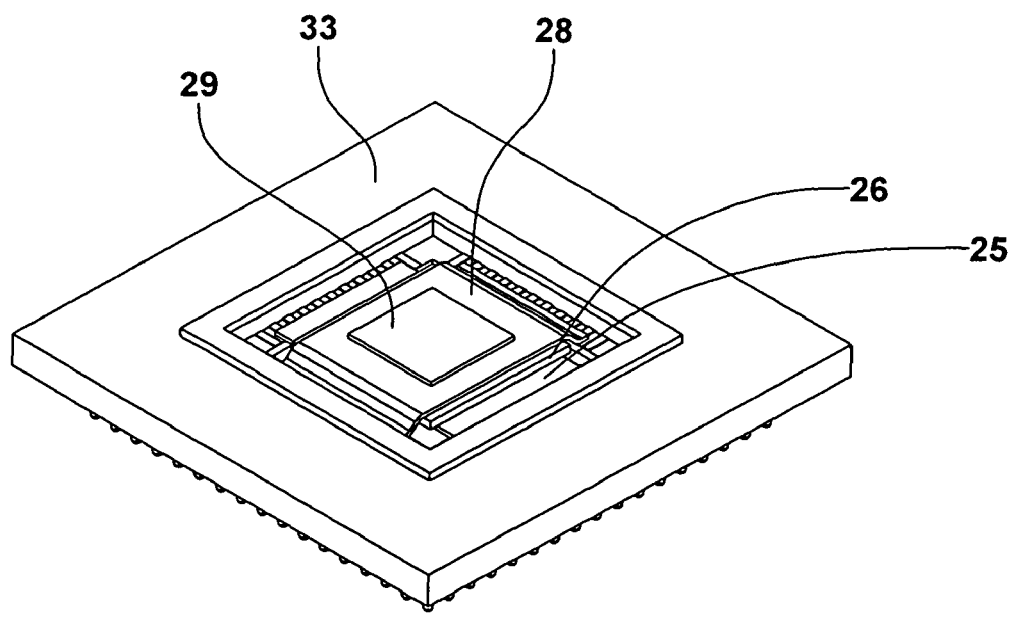
FIG. 2 shows a second embodiment of an infrared detector array without row drivers or column amplifiers and mounted in a pin grid array package.

It is not essential that the row drivers 22 and column amplifiers 23 be incorporated into the detector assembly. FIG. 2 shows a detector assembly consisting of a lower electrode support 25 (with column electrodes), a spacer 26, liquid crystal material, an upper electrode support 28 (with row electrodes), and an infrared absorbing layer 29 mounted in a pin grid array package 33. The package would normally be closed with a window made of infrared transmissive material such as silicon. In this case, the row drivers and column amplifiers are not part of the detector assembly and can be constructed with either integrated circuits or discrete components in a separate assembly.

Third Embodiment

Figure 3:
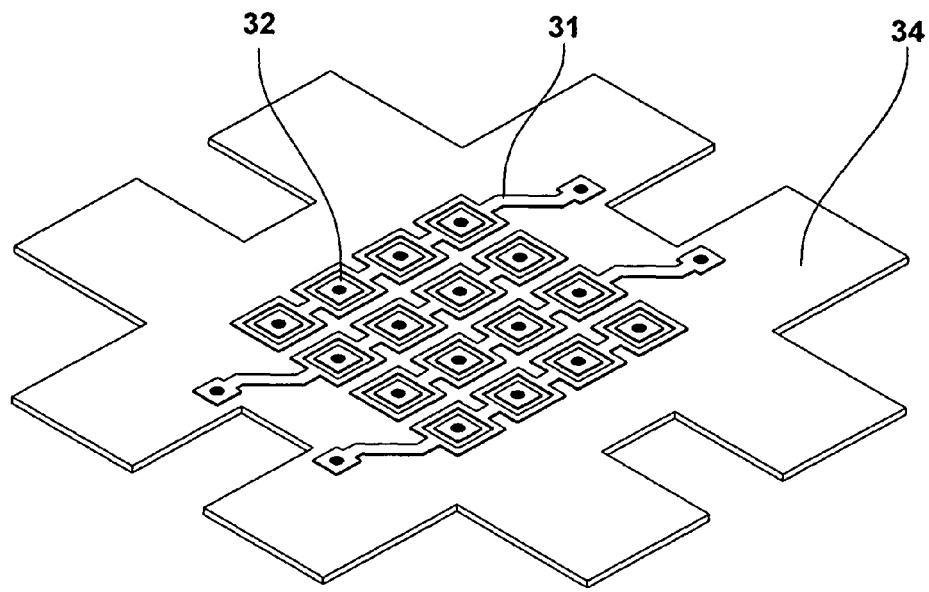
FIG. 3 is a top view of an alternate electrode arrangement where the row and column electrodes are fabricated on the same support.
Figure 3A:
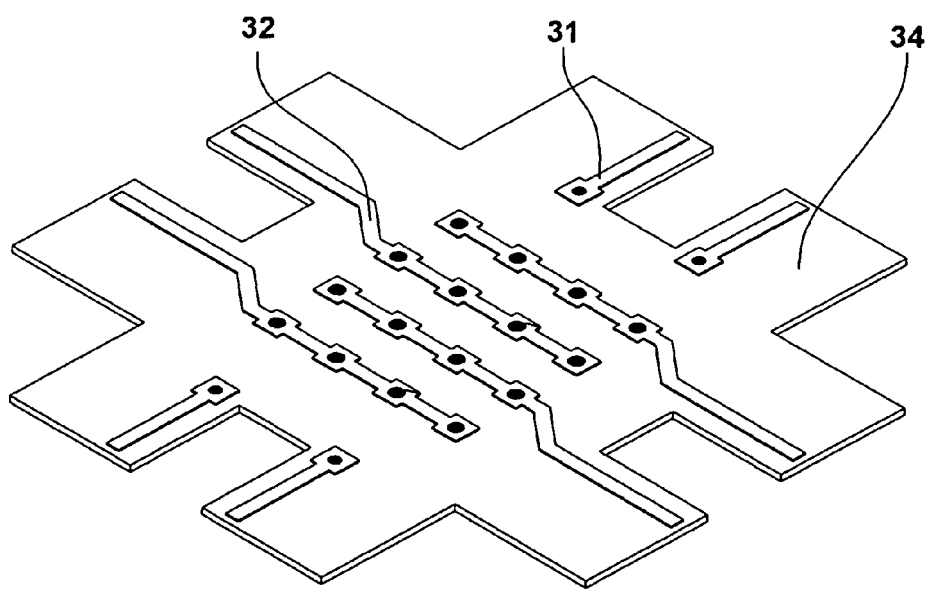
FIG. 3A is a bottom view of the same electrode arrangement.

The row and column electrodes do not have to be on separate supports. FIGS. 3 (top view) and 3A (bottom view) show both sets of electrodes fabricated on a single support 34. This arrangement places the electrodes on the top side of the support with the row electrodes 31 surrounding the column electrodes 32. The gap between the electrodes has an electrostatic field that extends above the surface of the support for a small distance, and a dielectric material in this area will alter the capacitance between the electrodes depending on its dielectric constant. This electrode structure is useful where the dielectric material is incorporated in a paint, such as the commercially available liquid crystal paints, or is incorporated as a powder in a binder such as gelatin. If these electrodes are placed against the surface of a material whose dielectric constant varies with temperature, local changes in temperature will result in changes in capacitance which can be measured in the same fashion as in the previous device to detect an infrared image. This makes this type of electrode structure useful with thick materials of low thermal conductivity. The front surface of the material senses the temperature changes caused by the infrared radiation and the thickness of the material serves as the thermal insulator. This allows the use of a thick section of material cut from a crystal such as triglycine sulfate.

Figure 4:
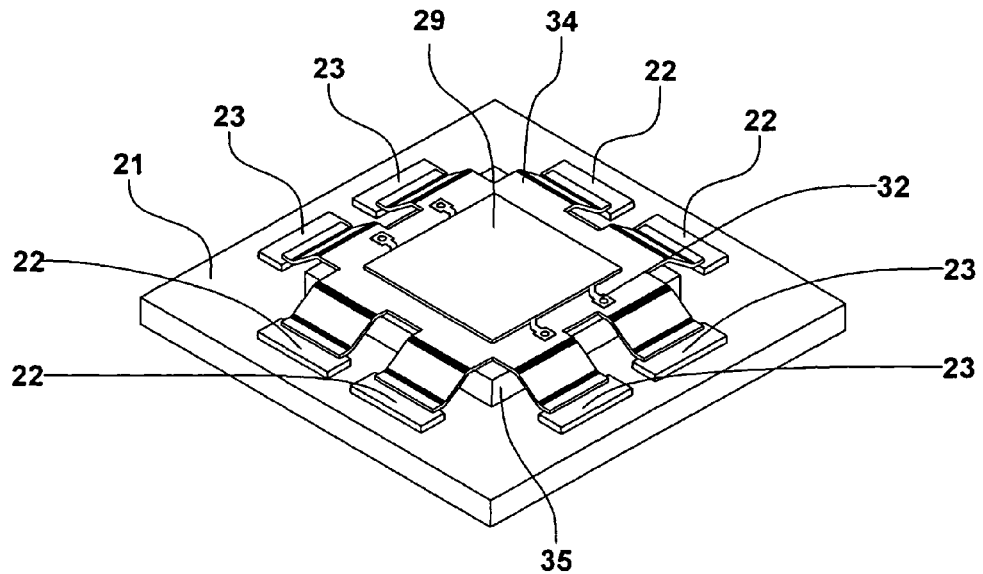
FIG. 4 shows a third embodiment of an infrared detector array using a single electrode support and a thick and solid dielectric material.
Figure 4A:
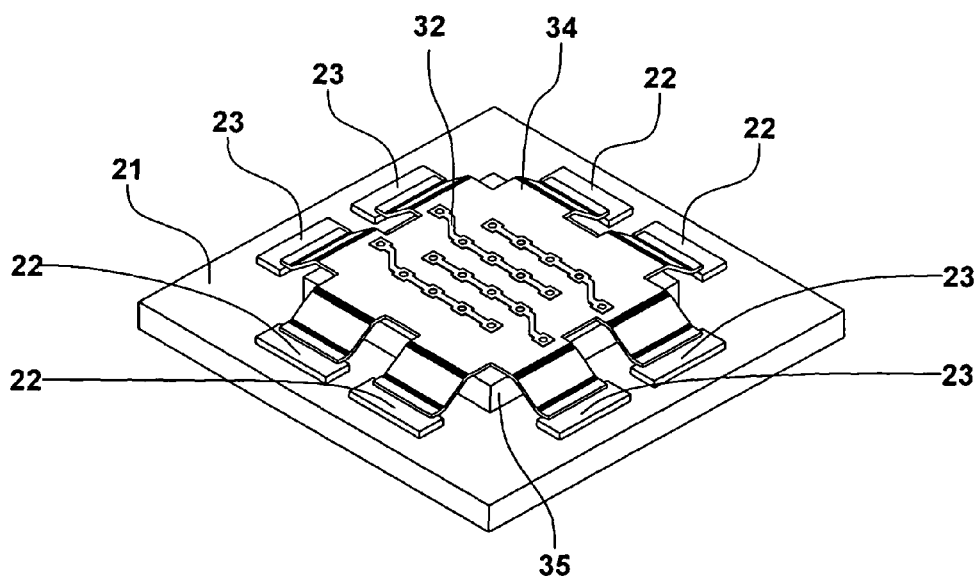
FIG. 4A shows the third embodiment with the infrared absorbtion layer removed.

FIGS. 4 and 4A show a third embodiment using this arrangement. An infrared absorbing layer 29 is placed on top of the column electrode connections on the top surface of the electrode support 34. This prevents the electrodes from reflecting the incident infrared energy. The row and column electrodes are placed on the bottom surface of the support 34 in contact with the dielectric material 35. The dielectric material can be a thick section and provides thermal isolation from the substrate 21. The column connections use vias to carry the column connections to the bottom surface of the support 34. The row electrode connections are already on the bottom surface. This allows both the row connections and the column connections to be made with automated bonding techniques to the row driver 22 and column amplifier 23 integrated circuits, which are also mounted on the substrate 21.

FIG. 4A shows the assembly with the infrared absorber removed. The connections for the column electrodes 32 are visible on the top surface of the electrode support 34, as well as the vias used to make connections to the column electrodes on the bottom surface of the electrode support 34.

Fourth Embodiment

Figure 5:
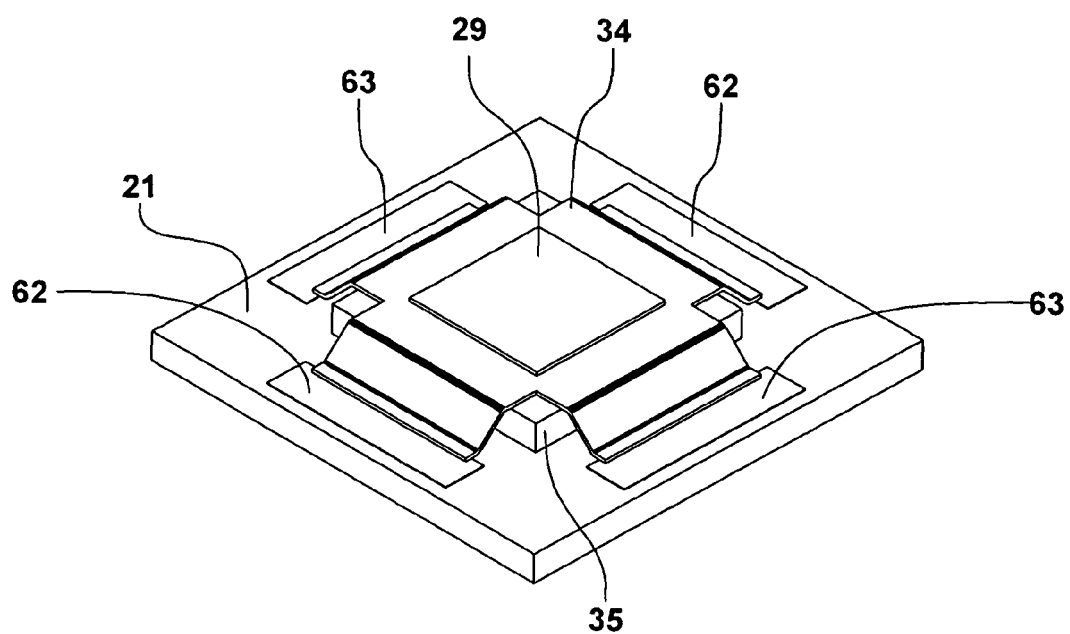
FIG. 5 shows a fourth embodiment with the row drivers and column amplifiers fabricated as thin film circuits on the substrate.

In a fourth embodiment, shown in FIG. 5, the row drivers 62 and column amplifiers 63 are fabricated directly on a glass substrate 21 using deposited thin film transistors using the techniques commonly employed in liquid crystal displays. The final assembly contains only three parts, a substrate 21 with row drivers 62 and column amplifiers 63 using thin film transistors, a thick piece of thermally sensitive dielectric material 35, such as triglycine sulfate, and the single electrode support 34 previously described, with an infrared absorbing coating 29 connected to the row drivers 62 and column amplifiers 63 using tape automated bonding techniques.

Operation of the Invention

Figure 6:
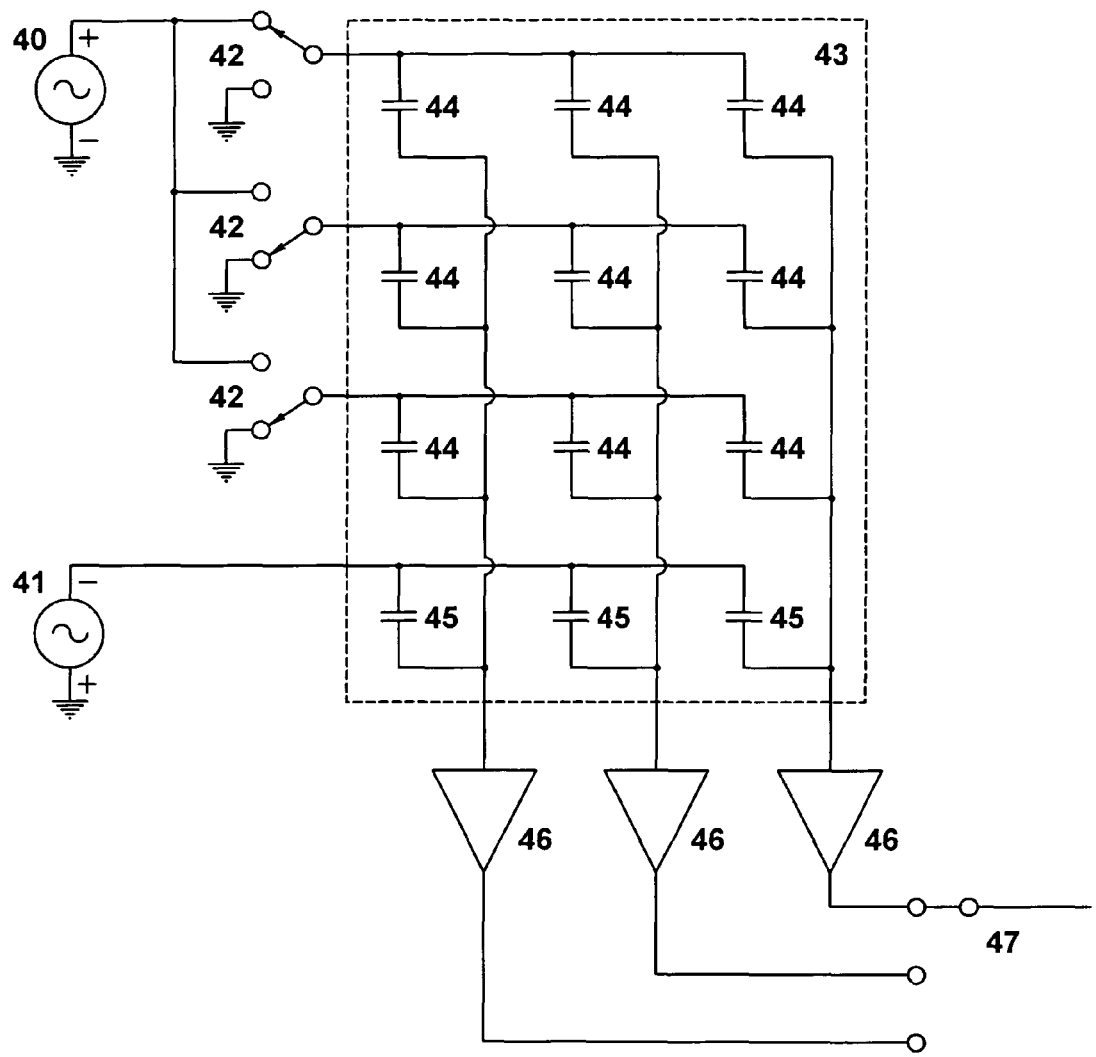
FIG. 6 is a schematic diagram showing the electrical circuits associated with a 3 by 3 element array.

FIG. 6 shows how the array is electrically driven and signals are derived from the capacitive elements. Each row electrode is connected to a electronically controlled row switch 42. Each switch connects its asssociated row electrode to ground or to a source of varying voltage 40. At any given time, only one row electrode is connected to the voltage source 40. All of the other row electrodes are connected to ground, and thus serve as shields for the column electrodes and to limit the spread of the electrostatic field from the active row electrode. The varying voltage on the active electrode couples through the elements 44 in that row and induces currents in the column electrodes. These currents are proportional to the capacitance of each element 44. Since the inactive row electrodes are grounded, they do not change potential, and do not induce currents in the adjacent column electrodes.

The column electrodes are each connected to a column amplifier 46. These amplifiers are of the transresistance type, where the output voltage is proportional to the input current. The input impedance of these amplifiers is low, such that the current in the column electrodes results in an insignificant voltage change on the column electrode. This prevents signals from being coupled from one column to the adjacent columns.

A second varying voltage source 41 is connected to an additional row of elements 45 that are shielded form the incident infrared radiation. The voltage of the source 41 is adjusted to be equal in magnitude and opposite in porlaity to the voltage source 40. The result is that currents are induced in the column electrodes which oppose the currents induced by the active row electrode. The array elements 44 are exposed to the heating effect of the infrared image, and the current induced in the column electrode will change depending on the heat transferred to each element. The shielded elements 45 are not exposed to radiation and their currents do not change. This removes a fixed signal level from each element and allows the changes due to radiation to be sensed with greater accuracy. The use of thermally shielded compensating elements instead of fixed capacitances also provides compensation for temperature variations.

The current from each column electrode is amplified and converted to a voltage by the column amplifiers 46. One of these amplifier outputs is selected by an electronically operated columnnswitch 47 to become the output signal for the array.

The array is scanned by selecting one row with one of the row switches 42. The column switch 47 then sequentially scans the outputs of all of the column amplifiers 46. When this process is completed, the next row has the voltage source 40 connected to it by its row switch 42, and the scanning operation of column switch 47 is repeated. This sequence is repeated until all of the image elements 44 have been addressed.

The time varying voltage supplied by sources 40 and 41 can be sinusoidal, square wave, pulsed, or any other suitable waveform.

The temperature of the liquid crystal material 27 in the absence of infrared radiation is established by conduction from the substrate 1 through the thermal insulator 24, the lower electrode support 25 and the column electrodes 32. The thermal impedance of this path should be as high as possible so that the change in temperature of the liquid crystal material 27 will be dependent mostly on the incident infrared radiation.

The thickness of the support layers 25 and 28, and the cross section of the electrode connections should be minimized. This minimizes the conduction of heat laterally from one detector element to its neighbors and improves the spatial resolution of the detector array.

The temperature of the substrate 21 should be uniform, and chosen such that the heat conducted from the substrate 21 to the liquid crystal material 27 is sufficient to maintain the temperature of the liquid crystal material 27 in the range where it is most sensitive to temperature changes.

Use of the Invention

Figure 7:
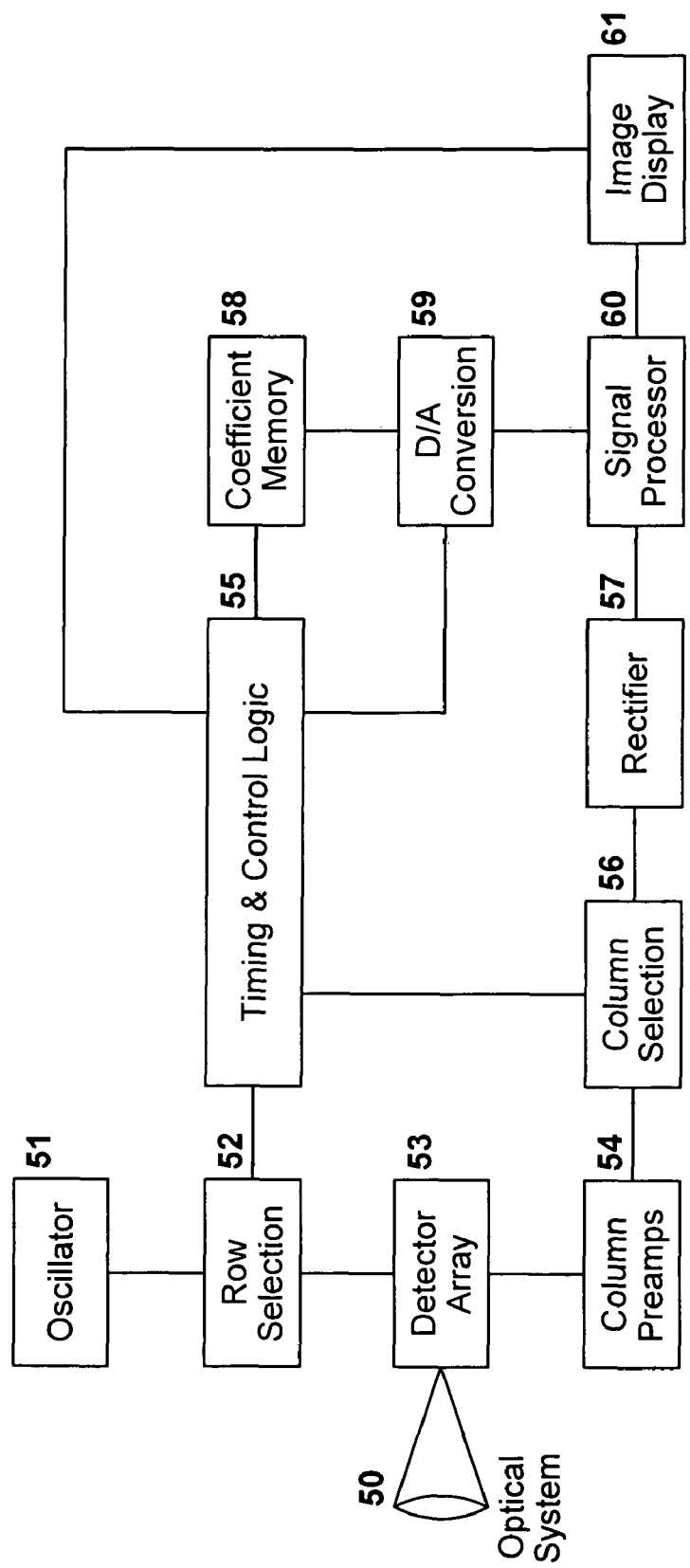
FIG. 7 is a block diagram of an entire infrared viewing system using the detector array.

FIG. 7 is a block diagram of a complete infrared imaging system using the detector assembly. An optical system 50 using either lenses or mirrors focusses an infrared image on the detector array 53. The oscillator 51 provides a drive signal which is switched to one of the row electrodes in the detector array 53 by the row selection switches 52. The row which is driven is determined by the timing and control logic 55. The column electrodes of the array are connected to the column preamps 54. The output of one of these preamps is sequentially selected by a column selector switch 56 under the control of the timing and control logic. The signal is converted to a DC level by a rectifier 57. At this point, the signal from each element is slightly different even if a uniform image is applied. These errors can be described as offset errors and gain errors. These errors are corrected by first subtracting a stored error value from the signal and the multiplying the result by a gain correction factor. These two values are stored for each pixel in the array in digital form in a coefficient memory 58. The values are recovered from the memory for each individual pixel and converted to two analog control signals with two digital to analog converters in the D/A conversion block 59. The corrected signal is sent to an image display device 61 such as a cathode ray tube display or liquid crystal display. The scanning of the display 61 is controlled by sync pulses generated by the timing and control logic 58.

The power supply for the electronic circuits and the temperature control system for the detector array are not shown in this diagram since there are many conventional ways of performing these functions.

The array elements are scanned by applying a varying voltage source 40 to one row of electrodes. The column signals are amplified by the column amplifiers 46. An electrically controlled column switch 47 sequentially scans all of the columns. This forms the signal for one row. The varying voltage source 40 is then applied to the next row, and the sequential scan of the column signals by the column switch 47 is repeated. This cycle is repeated until all of the rows have been scanned.

The scanned signals are rectified and filtered to create a video signal representing the results of sequentially scanning each element in the detector array.

In arrays with a large number of elements, the sampling rates and speed required of the signal processing can be reduced by arranging the outputs of the column amplifiers in groups, each of which has a separate column selection switch and a separate signal processing path after the switch.

The arrays shown have connections brought out on all sides of the array. This is normally desirable as it minimizes the connection density required. In arrays with small numbers of large elements, it may be desirable to bring the row connections out on only one side and the column connections out on either the top or bottom of the array.

What is claimed is:

1. A method of detecting infrared radiation comprised of the following steps;
   a) creating an alternating electric field using a source of alternating current and two electrodes,
   b) placing a material in a liquid-crystalline state in said alternating electric field,
   c) making a first measurement of the alternating current passing between said electrodes,
   d) absorbing incident infrared radiation in a radiation absorbing material,
   e) transferring the resulting heat to said material in a liquid-crystalline state,
   f) making a second measurement of the alternating current passing between said electrodes,
   g) determining the difference between said first and second alternating current measurements,
   h) wherein the said difference in alternating current is representative of the said incident infrared radiation.

2. A device for detecting thermal infrared images, said device comprising;
   a substrate maintained at a constant and uniform temperature,
   one or more supports,
   said supports being thermally isolated from said substrate,
   one or more electrode pairs supported by said supports,
   a material in a liquid-crystalline state also supported by said supports,
   where each of said electrode pairs can create an electric field within said material in a liquid-crystalline state.

3. The device of claim 2 wherein;
   the electrode pairs are arranged in an array with one or more rows and one or more columns, one electrode of each of said electrode pairs in each row are connected together by a row conductor,
   and the other electrode of said electrode pairs in each column are connected together by a column conductor.

4. The device of claim 3, further comprising;
   an electrically operated row switch for each row in said array,
   a column amplifier for each column in said array,
   each of said row switches being capable of connecting its associated row conductor to either ground or to a source of alternating current,
   where each of said column amplifiers has a low input impedance,
   and each of said column amplifiers is sensitive to an input current.

* * * * *